US010621083B2

(12) United States Patent
Nakagoe et al.

(10) Patent No.: US 10,621,083 B2
(45) Date of Patent: Apr. 14, 2020

(54) STORAGE SYSTEM AND STORAGE CONTROL METHOD

(71) Applicant: HITACHI, LTD., Tokyo (JP)

(72) Inventors: Hiroshi Nakagoe, Tokyo (JP); Akira Yamamoto, Tokyo (JP); Yoshihiro Yoshii, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 465 days.

(21) Appl. No.: 15/549,283

(22) PCT Filed: May 12, 2015

(86) PCT No.: PCT/JP2015/063563
§ 371 (c)(1),
(2) Date: Aug. 7, 2017

(87) PCT Pub. No.: WO2016/181481
PCT Pub. Date: Nov. 17, 2016

(65) Prior Publication Data
US 2018/0095873 A1    Apr. 5, 2018

(51) Int. Cl.
*G06F 12/00* (2006.01)
*G06F 12/02* (2006.01)
(Continued)

(52) U.S. Cl.
CPC .......... *G06F 12/0253* (2013.01); *G06F 3/061* (2013.01); *G06F 3/0608* (2013.01);
(Continued)

(58) Field of Classification Search
USPC ....................................................... 711/114
See application file for complete search history.

(56) References Cited

U.S. PATENT DOCUMENTS 8,527,544 B1    9/2013 Colgrove et al.
9,268,640 B1*   2/2016 Foley .................. G06F 11/1096
(Continued)

FOREIGN PATENT DOCUMENTS

JP    2000-010738 A    1/2000
WO    2014/184941 A1   11/2014

OTHER PUBLICATIONS

Rosenblum, M., & Ousterhout, J.K., "The Design and Implementation of a Log-Structured File System," ACM Transactions on Computer Systems (TOCS), 10(1), Electrical Engineering and Computer Science, Jul. 24, 1991, pp. 1-15.
(Continued)

*Primary Examiner* — Jae U Yu
(74) *Attorney, Agent, or Firm* — Volpe and Koenig, P.C.

(57)    ABSTRACT

A storage system selects from a plurality of physical areas constituting a physical address space as copy source physical areas, one or more non-additionally recordable physical areas each including a fragmented free area, and also selects a recordable physical area as a copy destination physical area. The storage system then writes one or more pieces of live data from the selected one or more copy source physical areas to the free area of the selected copy destination physical area on a per-strip or per-stripe basis, sequentially from the beginning of the free area. If the size of the write target data is such that it is not possible to write the write target data to the free area on a per-strip or per-stripe basis, then the storage system pads the write target data, and writes the padded write target data to the free area on a per-strip or per-stripe basis.

15 Claims, 10 Drawing Sheets

(51) Int. Cl.
*G06F 16/174* (2019.01)
*G06F 12/16* (2006.01)
*G06F 3/06* (2006.01)
*G06F 11/10* (2006.01)

(52) U.S. Cl.
CPC .......... *G06F 3/0619* (2013.01); *G06F 3/0647* (2013.01); *G06F 3/0652* (2013.01); *G06F 3/0689* (2013.01); *G06F 11/1076* (2013.01); *G06F 12/16* (2013.01); *G06F 16/1748* (2019.01); *G06F 3/0641* (2013.01); *G06F 2212/702* (2013.01)

(56) References Cited

U.S. PATENT DOCUMENTS

2003/0105928 A1* 6/2003 Ash ............... G06F 12/0804
711/136
2010/0037091 A1* 2/2010 Baderdinni ......... G06F 11/1076
714/6.12

OTHER PUBLICATIONS

International Search Report, PCT/JP2015/063563, dated Jul. 14, 2015, 1 pg.

\* cited by examiner

STORAGE SYSTEM AND STORAGE CONTROL METHOD

TECHNICAL FIELD

The present invention generally relates to garbage collection in a storage system.

BACKGROUND ART

The cost reduction demand for a storage system is high. Expectations are high for arithmetic compression and de-duplication that are capable of reducing the amount of data to be stored in the system.

The size of data to which the arithmetic compression has been applied is different from the size of the original data. As a result, the size of the logical address range of the original data is different from the size of the physical address range of the compressed data. When the de-duplication is applied, at least one piece among multiple pieces of redundant data is removed, the physical address of the remaining piece of data is associated with the logical address of the removed piece of redundant data. According to these facts, a storage system that adopts at least one of arithmetic compression and de-duplication adopts a log-structured scheme, which is a scheme of additionally writing into a physical address different from a logical address (the log-structured scheme may be adopted in a storage system that adopts none of the arithmetic compression and de-duplication).

The log-structured scheme invalidates the storage area for old data in update writing that updates at least a part of data having already been stored, de-duplication that eliminates at least one piece of data among pieces of data that are redundant with each other, and arithmetic compression that compresses data having already been stored (post-process arithmetic compression); the old data is, for example, any of the following pieces of data, i.e., a piece of data having not been updated yet by the update writing, a piece of data regarded as a de-duplication target by the de-duplication, and a piece of data having not been arithmetically compressed yet. The invalidated area becomes a free area. Consequently, such invalidation becomes a cause of fragmentation of the free area. The storage system that adopts the log-structured scheme requires garbage collection (GC) that collects fragmented free area (fragmented invalid area).

PTL 1 relates to a GC control method. The technology of PTL 1 identifies valid data (live data that is not invalid) using a physical-to-logical table for deriving a logical address from a physical address, identifies the logical address of the valid data using a logical-to-physical table for deriving a physical address from a logical address, copies the valid data into another area, and updates the physical-to-logical table and the logical-to-physical table so as to associate the copy-destination physical address with the logical address of the valid data.

The technology of NPL 1 can divide a physical address space into segments each having a certain size, and select a segment having a high GC efficiency as the copy source. More specifically, the technology of NPL 1 formalizes the GC efficiency on a segment-by-segment basis by Expression 1, and selects a segment having a high GC efficiency as the copy source. Expression 1 is an equation that means the concept of GC efficiency. More specifically, the live data space that is the amount of copy-target data in a segment is regarded as cost "u", a segment free space (1−u) (free space) obtained by multiplication of a coefficient "a" (age) that represents the oldness of the segment is regarded as a segment benefit (benefit), and the benefit to the cost is regarded as the GC efficiency (benefit/cost). Here, the oldness of a segment is the average of timestamps of pieces of data in the segment.

$$\text{benefit/cost} = \text{free space} * \text{age/live data space} = (1-u)*a/u \quad \text{(Expression 1)}$$

CITATION LIST

Patent Literature

[PTL 1] U.S. Pat. No. 8,527,544

Non Patent Literature

[NPL 1] Rosenblum, M., & Ousterhout, J. K. (1992). The design and implementation of a log-structured file system. ACM Transactions on Computer Systems (TOCS), 10(1), 26-52.

SUMMARY OF INVENTION

Technical Problem

Unfortunately, even if GC is controlled by the technology of PTL 1 and a segment having a high GC efficiency is selected by the technology of NPL 1, a high GC efficiency in a storage system cannot necessarily be achieved. An example of the reason is as follows. That is, if, in view of the RAID level, a RAID level (e.g., RAID 5 or RAID 6) that requires at least one parity for one stripe is such a RAID level, the GC efficiency can decrease owing to parity reading. More specifically, for example, according to data writing that updates a part of old data in one strip included in one stripe, a controller in a storage system is required to read the old parity (the parity having already been stored) and old data from a drive device. In this case, new data is generated by updating a part of the old data, and a new parity is generated by an arithmetic operation using the new data and old parity.

Such a problem can occur in another storage system that adopts the log-structured scheme, irrespective of whether at least one of the arithmetic compression and de-duplication is adopted or not.

Solution to Problem

A storage system includes: a plurality of physical storage devices that include one or more RAID groups; and a controller that is coupled to the plurality of physical storage devices and includes a processor and a storage unit. Each area in at least one RAID group is divided into a plurality of stripes. Each of the stripes includes a plurality of strips that are a plurality of areas corresponding to respective physical storage devices. Each of RAID configurations of one or more RAID groups is a RAID configuration that requires a parity per stripe. Address conversion information, which is information referred to by the controller for the sake of address conversion between a logical address in a logical address space and a physical address in a physical address space for one or more RAID groups, resides in at least one of the storage unit and the physical storage device. Data is additionally written into the physical address space by the controller. In the physical address space, the old data that is target data on any of update, compression, and de-duplication is invalidated by the controller, thereby causing a fragmented free area. The controller executes a copy GC (garbage collection) process using the address conversion information. The copy GC process includes: (A) from among a plurality of physical areas constituting the physical address space, selecting, as one or more copy source physical areas, one or more non-additionally recordable physical areas each including the fragmented free area; (B) selecting an additionally recordable physical area as a copy destination physical area from among the physical areas; and (C) writing one or more pieces of live data from the selected one or more copy source physical areas to a free area of the selected copy destination physical area on a per-strip or per-stripe basis, sequentially from a beginning of the free area. In (C), if a size of write target data is less than a size required for writing on the per-strip or per-stripe basis, then the controller pads the write target data, and writes the padded write target data to the free area on the per-strip or per-stripe basis.

Advantageous Effects of Invention

The performance of GC in the storage system can be improved.

DESCRIPTION OF EMBODIMENTS

Figure 1:
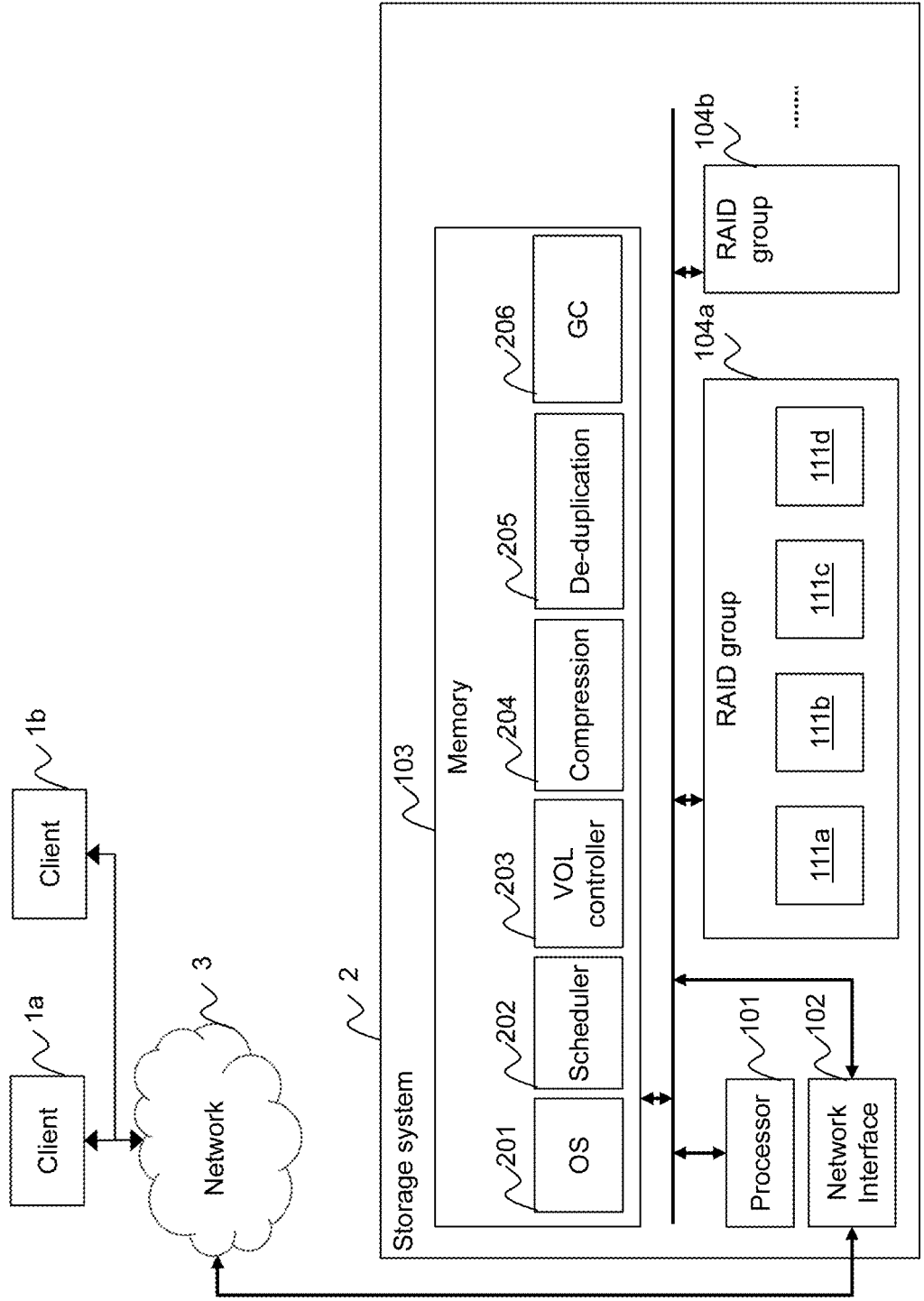
FIG. 1 shows a configuration example of a storage system according to Embodiment 1.

Some Embodiments are hereinafter described.

In the following description, information is sometimes described in the representation of "xxx table". The information may, however, be represented in any data structure instead. That is, to represent that the information may be represented independently of the data structure, "xxx table" may be called "xxx information". In the following description, the configuration of each table is an example. Alternatively, one table may be divided into two or more tables. All or some of the two or more tables may be a single table.

In the following description, in a case of description without discrimination between the same type of elements, a common reference number in a reference number or a reference sign is used. In a case of description with discrimination between the same type of elements, the reference sign of the element is used or an ID allocated to the element is sometimes used instead of the reference sign.

In the following description, a "storage unit" may be one or more storage devices that include a memory. For example, the storage unit may be at least a main storage device (typically, a volatile memory) between the main storage device and an auxiliary storage device (typically, a nonvolatile storage device).

In the following description, "PDEV" indicates a physical storage device, and may be typically a nonvolatile storage device (e.g., an auxiliary storage device). The PDEV may be, for example, an HDD (Hard Disk Drive) or an SSD (Solid State Drive). In the following Embodiments, the PDEV is called "drive device".

In the following description, "RAID" is an abbreviation of Redundant Array of Independent (or Inexpensive) Disks. A RAID group is made up of multiple drive devices, and stores data according to the RAID level associated with this RAID group. The RAID group may be called a parity group. The parity group may be, for example, a RAID group that stores parities.

In the following description, a process is sometimes described with a computer program being adopted as the subject of a sentence. The program is executed by a processor (e.g., a CPU (Central Processing Unit)), thereby performing a predetermined process appropriately using a storage unit (e.g., a memory) and/or an interface device (e.g., a communication port). Consequently, the subject of a sentence concerning the process may be the processor. The process described with a program being adopted as the subject of a sentence may be a process to be executed by the processor, an apparatus including the processor, or a system. The processor may include a hardware circuit that performs a part of or the entire process. The program may be installed from a program source to an apparatus, such as a computer. The program source may be, for example, a program distribution server or a computer-readable memory medium. In a case where the program source is a program distribution server, the program distribution server includes a processor (e.g., a CPU) and a storage unit. The storage unit may further store a distribution program, and a distribution target program. The processor of the program distribution server may execute the distribution program to allow the processor of the program distribution server to distribute the distribution target program to another computer. In the following description, two or more programs may be realized as a single program. Alternatively, a single program may be realized as two or more programs.

In the following description, "VOL" is an abbreviation of a logical volume, and may be a logical storage device. The VOL may be a real VOL (RVOL) or a virtual VOL (VVOL). The VOLs may be an online VOL that is provided for a host system coupled to a storage system providing the VOL, and an offline VOL that is not provided for the host system (unrecognizable from the host system). "RVOL" may be a VOL based on a drive device included in a storage system that includes the RVOL (e.g., one or more RAID groups). "VVOL" may be at least one of external VOL (EVOL), a thin provisioning VOL (TPVOL), and a snapshot VOL. The EVOL is based on a storage space (e.g., VOL) of an external storage system, and may be a VOL in conformity with a storage virtualization technology. The TPVOL includes multiple virtual areas (virtual storage areas), and may be a VOL in conformity with a capacity virtualization technology (typically, thin provisioning). The snapshot VOL may be a VOL provided as a snapshot of an original VOL. The TPVOL may be, typically, an online VOL. The snapshot VOL may be an RVOL. "Pool" is a logical storage area (e.g., a group of multiple pool VOLs), and may be provided for a usage-by-usage basis. For example, the pool may be at least one type of the TP pool and the snapshot pool. The TP pool may be a storage area that includes multiple real areas (real storage area). A real area may be allocated from the TP pool to a virtual area in TPVOL (e.g., in a case where no real area is allocated to a write-destination virtual area in TPVOL, an unallocated real area may be allocated from the TP pool to the write-destination virtual area). The snapshot pool may be a storage area that stores data evacuated from an original VOL. One pool may be used as a TP pool and also as a snapshot pool. "Pool VOL" may be a VOL that serves as a configuration element of a pool. The pool VOL may be an RVOL or an EVOL. The pool VOL may be, typically, an offline VOL.

Embodiment 1

FIG. 1 shows a configuration example of a storage system according to Embodiment 1.

A client (an example of a host system) 1 is provided with a data service provided by a storage system 2 via a network 3. Multiple clients 1 may be provided. In FIG. 1, clients 1a and 1b are shown as the clients 1. The network 3 may be an intra-network. Alternatively, this network may be the Internet or a LAN (Local Area Network) that couples the clients 1 and the storage system 2 to each other, or a SAN (Storage Area Network).

The storage system 2 stores data transmitted from the client 1 (stores write-target data according to a write request received from the client 1), and provides the client 1 with storage data (provides the client 1 with read-target data according to the write request received from the client 1). The storage system 2 may include multiple storage apparatuses. In FIG. 1, the storage system 2 includes one storage apparatus. The storage system 2 can provide various data services. The data services may include, for example, data copy in the storage apparatus, data remote copy between storage apparatuses, and obtaining a snapshot.

The storage system 2 includes multiple drive devices (hereinafter drives) 111, and a controller coupled to the multiple drives 111 (and the clients 1).

The drive 111 stores at least a part of data from the client 1. The multiple drives 111 constitute multiple (or a single) RAID group(s) 104. As the multiple RAID groups 104, RAID groups 104a and 104b are shown in FIG. 1. As an example, the RAID group 104a includes four drives 111a to 111d. At least one of the RAID groups 104 that is other than the RAID group 104a may have a configuration different from that of the RAID group 104a.

The controller includes a processor 101, a network interface 102, and a memory (an example of a storage unit) 103. The processor 101 executes programs deployed on the memory 103. The network interface 102 is an interface for coupling to the network 3. The programs deployed on the memory 103 may be, for example, an OS (Operating System) 201, a scheduler 202, a VOL controller 203, arithmetic compression 204, de-duplication 205, and GC (garbage collection) 206. At least a part of a process executed by the processor 101, for example, at least one of the arithmetic compression and de-duplication may be executed by a hardware circuit (e.g., ASIC (Application Specific Integrated Circuit) or FPGA (Field-Programmable Gate Array)) instead of the processor 101. The memory 103 may be used also as a cache memory where data to be written into the RAID group 104 and data read from the RAID group 104 are temporarily written.

The OS 201 provides a function of loading into the memory and the like; this function is a basic function of allowing the other programs to operate. The scheduler 202 controls the operation timing of the VOL controller 203, the arithmetic compression 204, the de-duplication 205, and the GC 206.

The VOL controller 203 controls management of the RAID groups 104, storing of write target data from the client 1 into the RAID group 104, and reading of storage data in response to a read request issued by the client 1. More specifically, for example, the VOL controller 203 manages a logical address space (logical space) and a physical address space (physical space). The logical address space may be a space that is RVOL provided for the client 1, or a space of a pool associated with TPVOL provided for the client 1. The physical address space may be the space of physical addresses of RAID group associated with the logical address space. The VOL controller 203 executes writing according to the log-structured scheme. For example, when a write target next to first data is second data, the VOL controller 203 prevents any space from occurring between the first data and the second data in the physical address space even though the second data is apart from the first data in the logical address space. In the description of this Embodiment, detailed representation of writing data into the physical address space corresponds to writing the data into one or more drives 111 that provide an area (an area in the RAID group 104) associated with the physical address that is the write destination of the data.

The arithmetic compression 204 applies arithmetic compression to write target data from the client 1. The arithmetic compression 204 may execute any of the arithmetic compression in an in-line manner and a post-process manner. In the in-line case, the arithmetic compression 204 executes the arithmetic compression in the middle of a write process according to a write request issued by the client 1. In the post-process case, the arithmetic compression 204 temporarily writes write target data from the client 1 into the drive 111, subsequently reads the target data from the drive 111 into the memory 103 in an asynchronous manner, executes the arithmetic compression, and writes the compressed data into the physical address space.

The de-duplication 205 checks the redundancy (identity) between pieces of data stored in the drive 111, and leaves at least one piece among the pieces of redundant data while removing the remaining pieces of redundant data. The de-duplication 205 may execute the de-duplication in any of an in-line manner and a post-process manner. In the in-line case, the de-duplication 205 executes the de-duplication in the middle of a write process according to a write request issued by the client 1. In the post-process case, the de-duplication 205 temporarily writes write target data from the client 1 into the drive 111, subsequently reads the target data from the drive 111 into the memory 103 in an asynchronous manner, and executes the de-duplication. In the in-line case, the de-duplication 205 may calculate a token used to check the identity between pieces of data, while executing the de-duplication itself asynchronously from writing by the client 1. The token may be a hash value obtained by applying data to a hash function.

In any of update writing, de-duplication, and data writing after arithmetic compression executed in the post process, an area where old data is stored in the physical address space is invalidated; the old data is, for example, data corresponding to any of data updated by update writing, redundant data that becomes a de-duplication target by de-duplication, and data having not been arithmetically compressed yet. The GC 206 executes GC that collects free areas (invalid areas) caused by the update writing, the de-duplication, and the arithmetic compression executed in the post process.

Figure 2:
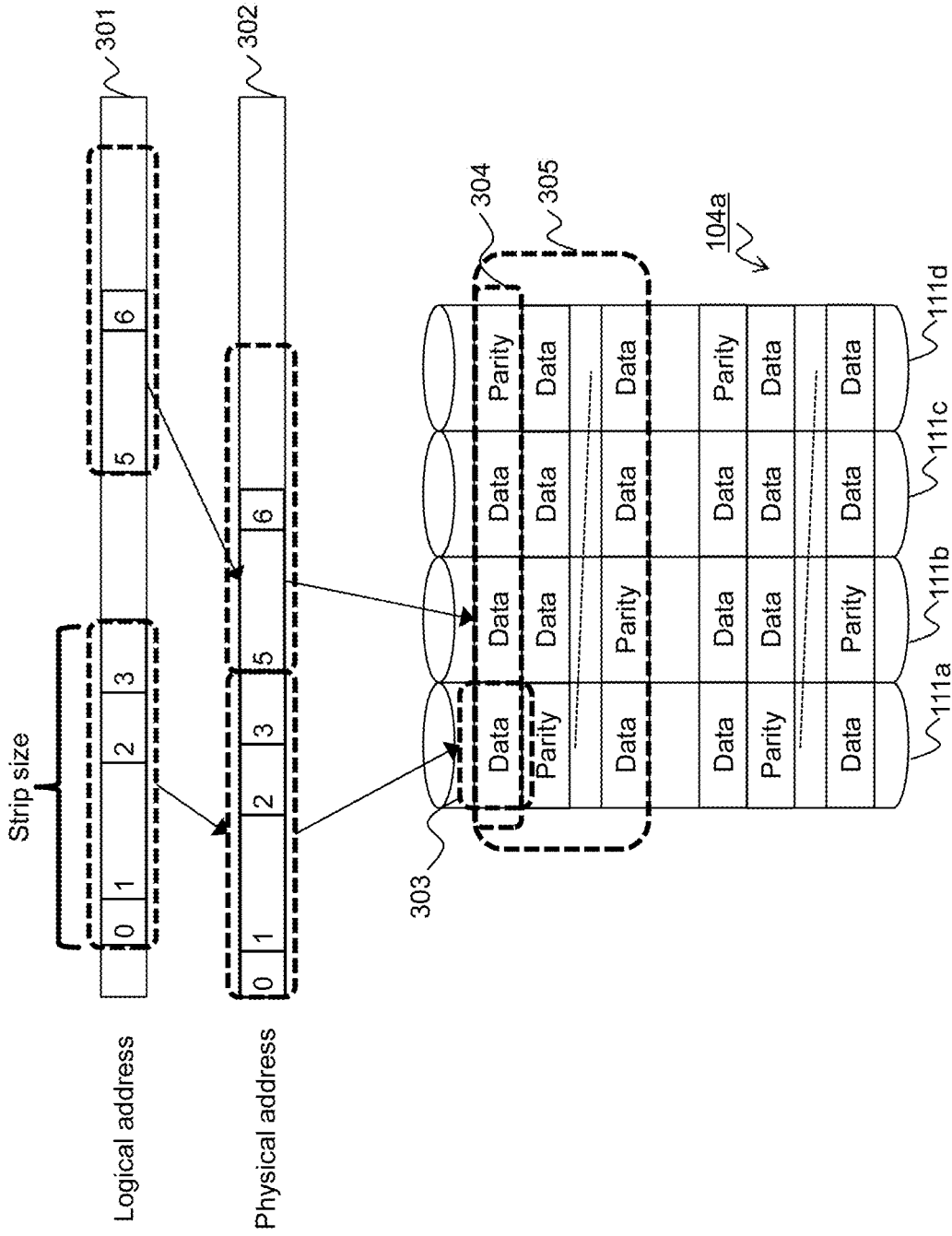
FIG. 2 shows an example of data storage into a RAID group according to a log-structured scheme.

Subsequently, referring to FIG. 2, an example of data storage into the RAID group 104a according to the log-structured scheme is described.

The RAID group 104a has a RAID configuration (RAID 5 (3D+1P)) that stores one parity for three pieces of data. The area provided by the RAID group 104a is divided into multiple stripes 304. The stripe 304 includes multiple strips 303 provided by the drives 111a to 111d that constitute the RAID group 104a. The strip 303 is a unit area provided by the drive 111. The area provided by the drive 111 is divided into multiple strips 303. The strip size is, for example, 512 KB. A page 305 corresponds to multiple stripes 304. The page 305 is a unit area in a physical address space 302. That is, the physical address space 302 may be divided into multiple pages 305. In a case where the page 305 is a physical unit area, for example, a real area in the pool may be the unit area in a logical address space 301, for example. The size of the page 305 is, typically, smaller than the product of the number of stripes corresponding to the page 305 and the stripe size (this is because the size of a parity storing strip is not counted). In the following description, data on a per-strip basis can be called "strip data", data on a per stripe basis (correctly, data having a size obtained by subtracting the strip size for the parity from the stripe size) can be called "stripe data", and data on a per-page basis can be called "page data".

The number of drives 111 that constitute the RAID group 104a can be changed. For example, while the RAID level is left to be RAID 5 as it is, the 3D+1P configuration that assigns one parity to three pieces of data can be changed to the 7D+1P configuration that assigns one parity to seven pieces of data. The size of the page 305 may be a common multiple of the number of data (x) in multiple RAID configurations (xD+yP) corresponding to the respective RAID groups 104. For example, in a case where the multiple RAID groups 104 are the RAID 5 (3D+1P) RAID group and the RAID 5 (7D+1P) RAID group, the size of the page 305 may be 42 MB. Numeric 42 is a common multiple of three, which is the number of pieces of RAID 5 (3D+1P) data, and seven, which is the number of pieces of RAID 5 (7D+1P) data.

The logical address space 301 is, for example, an address space (e.g., RVOL) for the client 1. Even in a case where the logical address range of pieces of data 0 to 3 and the logical address range of pieces of data 5 and 6 are apart from each other in the logical address space 301, the VOL controller 203 configures the physical address range of pieces of data 5 and 6 to be next to the physical address range of pieces of data 0 to 3 (so that no free area can occur between the physical address range of pieces of data 0 to 3 and the physical address range of pieces of data 5 and 6) in the physical address space (the space having an address system different from that of the logical address space 301). More specifically, for example, the write destinations of pieces of data 0 to 3 and pieces of data 5 and 6 are configured to be areas sequentially continuous from the beginning of the physical address space 302. In actuality, the pieces of data 0 to 3 and 5 and 6 are written in the positions (the areas in the RAID group 104) corresponding to the physical addresses in the physical address space 302.

This also applies to update writing, and writing data compressed by the arithmetic compression 204 executed in the post process. For example, in a case where data 0 in FIG. 2 is updated, new data (updated data) 0' is arranged close to data 6 in the physical address space 202 (additionally written next to the data 6) and the storage area for the old data 0 (physical address range) is invalidated. When the piece of data 5 between pieces of data 1 and 5 redundant to each other is regarded by the de-duplication 205 as the de-duplication target, the storage area of the piece of old data 5 is invalidated.

In the RAID group 104a, data is written in units of strips 303. More specifically, for example, in the strip 303 of the drive 111a, the beginning piece of strip data among pieces of data 0 to 3 and 5 and 6 in the physical address space is written. In the strip 303 of the drive 111b, a piece of strip data next to the beginning piece of strip data (a piece of strip data having a physical address next to the physical address of the beginning piece of strip data) is written. The parity (strip size) based on the respective three pieces of strip data written in the three drives 111a to 111c are written in the drive 111d.

Figure 3:
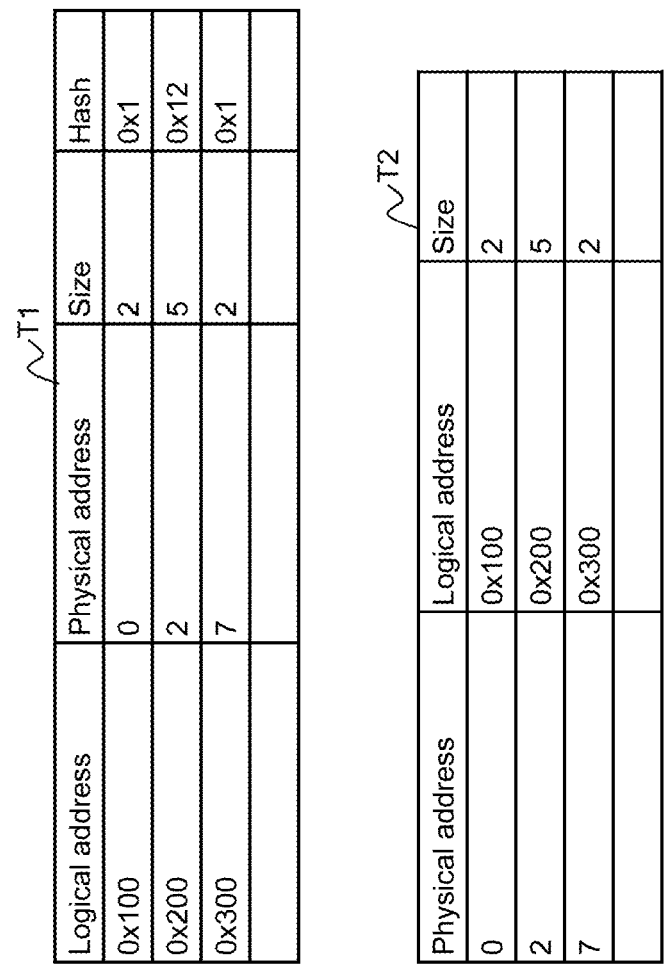
FIG. 3 shows configuration examples of a logical-to-physical table and a physical-to-logical table.

Subsequently, referring to FIG. 3, the logical-to-physical table T1 and the physical-to-logical table T2 are described.

The logical-to-physical table T1 is an example of logical-to-physical conversion information, and is an address conversion table for converting the logical address into the physical address. The physical-to-logical table T2 is an example of physical-to-logical conversion information, and is an address conversion table for converting the physical address into the logical address. Preferably, the entire table that is at least one of the logical-to-physical table T1 and the physical-to-logical table T2 is stored in the memory 103. Alternatively, at least a part of the logical-to-physical table T1 and physical-to-logical table T2 may be stored in at least one of the drives 111 because the size of the table is large or the like.

The logical-to-physical table T1 has entries for the respective logical addresses. The logical address, the physical address, the size and the hash value are registered in each entry. The type of information registered in the logical-to-physical table T1 is not necessarily limited to these types. On the other hand, the physical-to-logical table T2 has entries for the respective physical addresses. The physical address, the logical address, and the size are registered in each entry. Likewise, the type of information registered in the physical-to-logical table T2 is not necessarily limited to these types. For example, in FIG. 3, the logical-to-physical table T1 has logical addresses. Alternatively, the management unit of logical addresses may be configured to have a fixed block size, and the arrangement may be configured sequentially in the order of logical addresses, thereby negating the need to register the logical addresses and allowing the logical-to-physical table T1 to have only the physical addresses, the sizes and the hash values. In a case where neither the arithmetic compression nor the de-duplication is adopted, the size is the unit size of writing from the client 1 and is not variable. Consequently, the size is not necessarily registered in the logical-to-physical table T1. Likewise, in FIG. 3, the physical-to-logical table T2 has physical addresses. Alternatively, the management unit of physical addresses may be configured to have a fixed block size, and the arrangement may be configured sequentially in the order of physical addresses, thereby negating the need to register the physical addresses and allowing the physical-to-logical table T2 to have only the logical addresses and the sizes. Furthermore, in the physical-to-logical table T2, the size corresponding to the logical address associated with the physical address can be known from the logical-to-physical table T1. Consequently, it is only required that the size is registered in any one of the physical-to-logical table T2 and the logical-to-physical table T1. The fixed block size is, for example, 512 B or 4 KB. In FIG. 3, the hash values are registered in the logical-to-physical table T1. Alternatively, another table having pairs of logical addresses and hash values may be prepared. In this case, an implementation mode, such as B-Tree format using hash values as keys, can be adopted. Consequently, it can be expected to reduce the processing load of the de-duplication 205.

In normal writing, the VOL controller 203 caches write-target data in response to a write request issued by the client into the memory 103, determines the additional-writing final address as the physical address for the data, writes the data in the position (the area in the RAID group 104) indicated by the physical address, and updates the logical-to-physical table T1 and the physical-to-logical table T2.

In update writing, the VOL controller 203 caches write-target data in response to a write request issued by the client into the memory 103, and determines the physical address of new data obtained by updating the old data using the write-target data. The VOL controller 203 writes the new data at the position (the area in the RAID group 104) indicated by the physical address. The VOL controller 203 removes what relates to the old data from the logical-to-physical table T1 and the physical-to-logical table T2, and registers information about the new data in the logical-to-physical table T1 and the physical-to-logical table T2. For example, in a case where the old data (data having not been updated yet) having the logical address "0x100" and the size "2" is updated, in the entry including the logical address "0x100" in the logical-to-physical table T1, the physical address is updated to "9" (the physical address of the new data), and the size is still "2" (the new data has the same size because the new data is data updated from the old data), and the hash value is updated to the hash value of the new data. From the physical-to-logical table T2, the entry (entry information) where the physical address of the old data is "0" is removed. In the entry of the physical-to-logical table T2, the physical address "9", the logical address "0x100" and the size "2" are registered. As a result, the area having the physical address "0" becomes an invalid area.

In the post-process arithmetic compression, the arithmetic compression 204 caches target data into the memory 103, arithmetically compresses the data, determines the physical address, and writes the data at the position (the area in the RAID group 104) indicated by the physical address. The arithmetic compression 204 removes information about the old data (data having not been arithmetically compressed yet) from the logical-to-physical table T1 and the physical-to-logical table T2, and registers information about the compressed data in the logical-to-physical table T1 and the physical-to-logical table T2. For example, in FIG. 3, in a case where data having the logical address "0x100" and the size "2" is updated and new data (compressed data) has the size "1", in the entry including the logical address "0x100" in the logical-to-physical table T1, the physical address is updated to "9" (the physical address of the new data), and the size is "1", and the hash value is updated to the hash value of the compressed data. From the physical-to-logical table T2, the entry where the physical address of the old data is "0" is removed. In the entry of the physical-to-logical table T2, the physical address "9", the logical address "0x100" and the size "1" are registered.

In the de-duplication, the de-duplication 205 caches target data in the memory 103, derives the hash value, and searches the logical-to-physical table T1 for the same hash value as the derived hash value. When the same hash value is found, the de-duplication duplication 205 updates the logical-to-physical table T1 and the physical-to-logical table T2. For example, in FIG. 3, in a case where first data having the logical address "0x100" and the size "2" and second data having the logical address "0x300" and the size "2" are the same as each other and the second data is to be de-duplicated, in the entry including the logical address "0x300" in the logical-to-physical table T1, the physical address is updated to "0" (identical to the physical address of the first data) (the size and the hash value are not changed). The entry having the physical address "7" is removed from the physical-to-logical table T2. In this Embodiment, for the sake of simplicity of description, the logical address "0x300" of the second data that is the de-duplication target may be added to the entry having the physical address "0" in the physical-to-logical table T2. However, this is not limit the implementation of this Embodiment. For example, the physical-to-logical table T2 may be implemented so that multiple logical addresses can be referred to with respect to each physical address.

Subsequently, GC is described.

GCs include threading GC and copying GC.

The threading GC is a method that manages the fragmented free area generated by update writing and de-duplication according to a method such as registering the position information about the free area (e.g., the beginning address and the size) in the table, and adopts the write-destination physical address of write-target data from the client 1 as the physical address of the managed fragmented free area. In the threading GC, the physical address of a free area having the same size as data to be written has may be retrieved as the write-destination physical address of the data. Alternatively, the data may be divided, thereby allowing the addresses of multiple free areas to be adopted as multiple write-destination physical addresses.

On the other hand, the copying GC is a method that copies live data (valid data) in a first area containing a fragmented free area to a second area different from the first area to make the first area be a continuous free area. Each of the first and second areas may be a unit area having a predetermined size, for example, a page.

The storage system 2 according to this Embodiment adopts the copying GC. The copying GC is improved so as to write data into the RAID group on a per-strip basis or on a per-stripe basis. As a result, the GC efficiency is improved. The GC 206 starts the GC processing flow (e.g., the processing flow of FIG. 4) asynchronously from the write process (e.g., periodically). If two or more pages having a fragmented free area reside at the time of start of the processing flow, execution of the copying GC with the two or more pages being adopted as copy sources allows each of the two or more pages to be adopted as a free area. The start timing of the GC processing flow is determined by the scheduler 202. The period of the start of the GC processing flow can be called "GC period". The GC period may be a short period or a long period. In the case of a short period, the amount of a copy-target data in one time of GC is small. Consequently, the time required for GC (TAT (Turn Around Time)) is believed to be small. On the other hand, in the case of a long period, the amount of a copy-target data in one time of GC is high. Consequently, the throughput of GC is believed to be large. For example, in a case where the frequency of I/Os from the client 1 (e.g., the frequency of receipts of write requests and read requests) is high, it is believed to be preferred that the GC period be short. This is because if the GC period is long, many fragmented free areas are believed to occur to reduce the I/O performance (in particular, read performance). On the other hand, in a case where the frequency of I/Os from the client 1 is low such as in the night, it is believed that a long GC period causes no problem. The length of GC period can be determined according to a management policy or the like.

In this Embodiment, the processing unit (copying unit) of copying GC is the page 305. This is because the storage system 2 manages the free space on a per-page basis, free space reservation in a unit less than a page does not serve as free space reservation in view of management and is inefficient.

Figure 4:
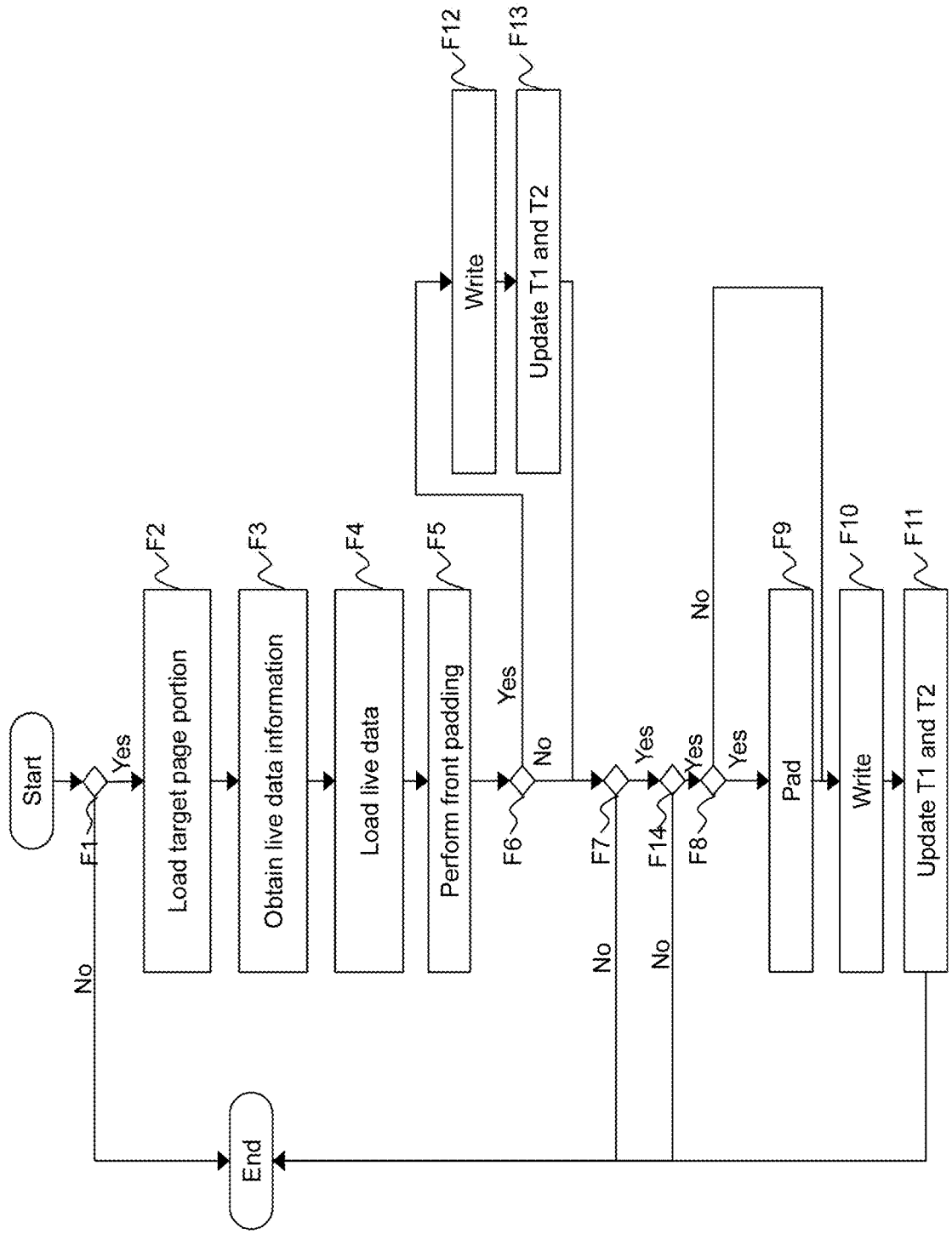
FIG. 4 shows an example of a GC processing flow according to Embodiment 1.

Referring to FIG. 4, the GC processing flow is described.

The GC 206 determines whether all target pages have been subjected to GC or not (F1). The "target page" here is a non-additionally recordable page that contains a fragmented free area. The "non-additionally recordable page" is a page in which data has been written from the beginning to the end. The non-additionally recordable pages include a page where only live data resides, and a page where not only live data but also a fragmented free area resides. The "target page" here is a non-additionally recordable page that contains a fragmented free area, as described above. The non-additionally recordable page that contains a fragmented free area can be identified by referring to the physical-to-logical table T2 (the physical address and size of each entry). When the determination result of F1 is affirmative, the processing flow is finished.

When the determination result is true, the GC 206 selects one target page as a copy-source page and loads the page data on the selected target page, as it is, into the memory 103 (F2). Accordingly, as the result of F2, in an area occupied by the page data on the target page in the memory 103, a free area (an area occupied by invalid data) resides. Subsequently, the GC 206 identifies live data in the page data loaded in F2 by referring to the physical-to-logical table T2 (F3). The GC 206 loads (copies) only the live data in F3 identified from the page data loaded in F2, to the memory 103 (F4). Subsequently, the GC 206 removes the gap (free area) between the pieces of live data loaded in F4 (F5). Instead of F4 and F5, the GC 206 may copy two or more pieces of live data from the page data loaded in F4 to another area in the memory 103 in the physical address order (i.e., in a chronological order in view of time-series because of the additionally recordable scheme). At this time, the GC 206 may arrange the two or more pieces of live data in the logical address order (however, the arrangement in the logical address order requires many pieces of data to be loaded in the memory; it is believed that this arrangement not suitable for GC with a short period).

The GC 206 determines whether the sum of the sizes of pieces of data continuously arranged in F5 is equal to or larger than the size of stripe data or not (F6).

When the determination result of F6 is true, the GC 206 writes stripe data among the continuous pieces of live data in the memory 103 into a free stripe corresponding to the copy-destination page (F12). The GC 206 updates the logical-to-physical table T1 and the physical-to-logical table T2 on the basis of the writing in F12 (F13). The "copy-destination page" is the additionally recordable page selected as the copy destination by the GC 206. The "additionally recordable page" is an open page (a page where data has been written from the beginning of the page but has not been written to the end), or a free page (a page where no live data resides and only a free area resides). According to the writing in the GC processing flow (F12 or F10), in a case without any copy-destination page, the GC 206 selects the additionally recordable page as the copy-destination page. The additionally recordable page can be identified from the physical-to-logical table T2. According to the writing in the GC processing flow (F12 or F10), the GC 206 writes the stripe data into the beginning free stripe in the copy-destination page. Thus, the pieces of stripe data are written in the copy-destination page in the physical address order.

After F6, the GC 206 determines whether all target pages have been subjected to GC or not (F7). When the determination result of F7 is false, F2 to F5 are performed. In F2 to F5, when any piece of data having not been written in the copy-destination page yet remains in the memory 103, the pieces of live data are arranged subsequent to the remaining piece of data.

When the determination result of F7 is true, the GC 206 determines whether any piece of data having not been written yet into the copy-destination page resides in the memory 103 or not (F14). When the determination result of F14 is false, the processing flow is finished.

When the determination result of F14 is true, the GC 206 determines whether or not padding is to be applied to unwritten data having not been written into the copy-destination page yet (one or more pieces of live data (valid data) reside in the memory 103) (F8). Without any distinction of specific padding methods, this Embodiment adopts a method of padding with zero data (every bit value is "0"). The padded data is called "padding data". The size of padding data can be called "padding size". The case where the determination result of F8 is true is any of the following (8-1) to (8-3), for example.

(8-1) The size of unwritten data is less than the strip size. In this case, neither writing on a per-strip basis nor writing on a per-stripe basis can be performed without padding.

(8-2) The size of unwritten data is equal to or more than the strip size, but is not an integral multiple of the strip size. In this case, neither writing on a per-strip basis nor writing on a per-stripe basis can be performed without padding.

(8-3) The size of unwritten data is equal to or more than the strip size and is an integral multiple of the strip size, but writing on a per-stripe basis is required. In this case, writing on a per-stripe basis cannot be performed without padding.

When the determination result of F8 is true, the GC 206 pads unwritten data, thereby making the unwritten data m pieces of strip data (m is an integer that is one or more and less than the number of pieces of stripe data that constitute the stripe data) or one piece of stripe data (F9). The GC 206 writes the m pieces of strip data into m strips in a free stripe in the copy-destination page, or writes one pieces of stripe data into the free stripe in the copy-destination page (F10). The GC 206 updates the logical-to-physical table T1 and the physical-to-logical table T2 on the basis of the writing in F10 (F11).

The table updating in F11 and F13 is performed, for example, as follows. The GC 206 updates the copy-source physical addresses in the physical-to-logical table T2 and the logical-to-physical table T1 to the copy-destination physical addresses, for every piece of live data copied to (written into) the copy-destination page. Thus, the write-destination area of the padding data is treated as an available area. In a case where the physical-to-logical table T2 holds not only the logical address of data having not been de-duplicated but also all the linked logical addresses with respect to one physical address, the logical address of the corresponding data is referred to in the physical-to-logical table T2 to thereby allow the physical address indicated by the logical address in the logical-to-physical table T1 to be rewritten.

The example of GC processing flow has thus been described.

According to the processing flow in FIG. 4, in the copy-destination page, one or more pieces of live data are sequentially written, and writing to the copy-destination page is performed without padding and on a per-stripe basis in principle. The stripe-based writing does not require data reading or parity reading from the write destination. Consequently, the writing load can be reduced.

The padding is performed only when the size of the last unwritten data is less than the size of stripe data or the size of strip data. Consequently, the writing load can be further reduced.

The processing flow can perform strip-based writing for the last unwritten data. The strip-based writing does not require data reading from the write destination. Consequently, the writing load can be reduced.

The padding size may be restricted to be less than the strip size. This restriction can reduce the load due to padding. Even when the padding size is less than the strip size, at least the strip-based writing between the stripe-based writing and the strip-based writing can be performed.

In F9 and F10, it may be predetermined whether the stripe-based writing is performed or the strip-based writing is performed, or it may be selected on the basis of configured information (e.g., a policy). As a specific example of the latter case, for example, any of the following (10-1) to (10-3) may be adopted.

(10-1) When the size of unwritten data is larger than ½ (50%) of the stripe size (when the padding size is less than ½ of the stripe size), padding for stripe-based writing is performed. This is because the padding size is allowed to be relatively small.

(10-2) When the quotient Q obtained by dividing the size of unwritten data by the strip size is (M−1), padding for stripe-based writing is performed. M is the number of pieces of strip data that constitute the stripe data. Consequently, the fact Q=M−1 is that the padding size is less than the strip size. In this example, unwritten data is allowed to be stripe data with a little padding.

(10-3) When the size of unwritten data is less than the strip size, padding for generating one piece of strip data is performed. This is because writing can be executed with the padding less than padding for generating the stripe data.

According to the processing flow of FIG. 4, data is written on a per-stripe basis from the beginning. When the used stripe (a stripe in which at least one piece of strip data has been written) at the end among the used stripes in the copy-destination page has a free strip as a result of the processing flow at the last time, strip-based writing for filling all the strips of the used stripe may be performed, and subsequently stripe-based writing may be performed in principle.

Embodiment 2

Embodiment 2 is described. At this time, the difference from Embodiment 1 is mainly described. The points common to those of Embodiment 1 are omitted or simplified.

Embodiment 1 is the example focusing on reduction in load of writing in GC (Copying GC). This Embodiment is an example focusing on copy-source page selection.

Figure 5:
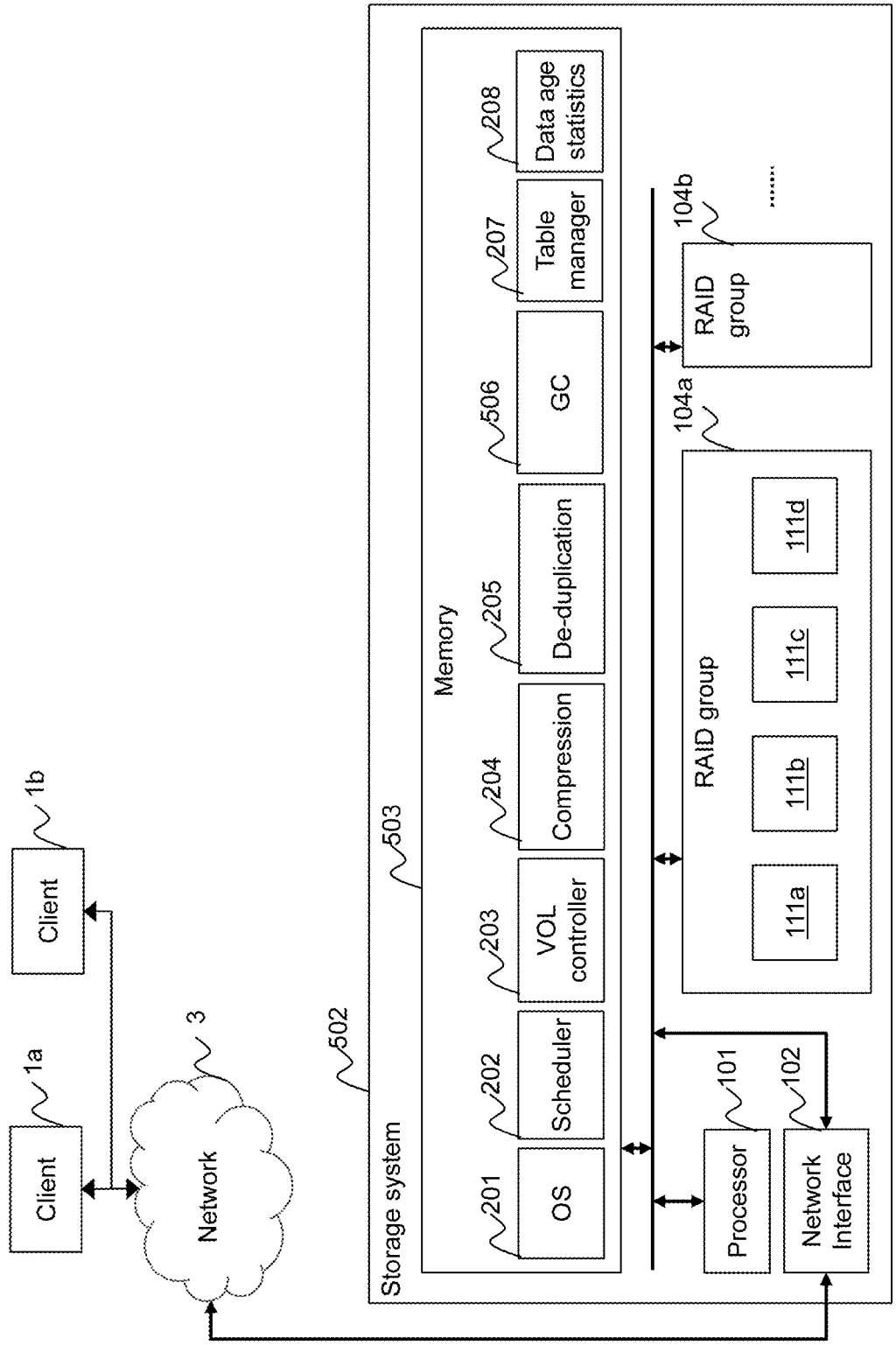
FIG. 5 shows a configuration example of a storage system according to Embodiment 2.

FIG. 5 shows a configuration example of a storage system according to Embodiment 2.

The storage system 502 further includes table management 207 and data age statistics 208, as programs executed by the processor 101. The table management 207 manages whether the logical-to-physical table T1 and the physical-to-logical table T2 are resident on a memory 503 or not. The data age statistics 208 obtains the statistics pertaining to the access frequency aging-reduction variation of data stored in a GC operation target VOL. The "access frequency aging-reduction variation" of data means the degree of reduction in access frequency with respect to the data age (e.g., the time elapsed after the data was written in the physical address space). For example, the frequency of accessing relatively new pieces of data written in a period ranging from the day of the access to the day three-month prior to the access is high, while the frequency of accessing old pieces of data written in a period ranging from the day three-month prior to the access to the day several-year prior to the access is low. In file servers and the like, the access frequency exponentially decreases with increase in data age. On the other hand, in database servers, data warehouses and the like, all the pieces of data are regarded as search targets irrespective of the data age. Consequently, the access frequency is constant irrespective of the data age. The GC 506 executes the processing flow of copy-source page selection in the GC processing flow.

The arrangement places of the logical-to-physical table T1 and the physical-to-logical table T2, and the data access frequency aging-reduction variation affect selection of the GC target page (copy-source page). This is because the GC benefit is proportional to the data age while being inversely proportional to cost (GC processing load).

Figure 7:
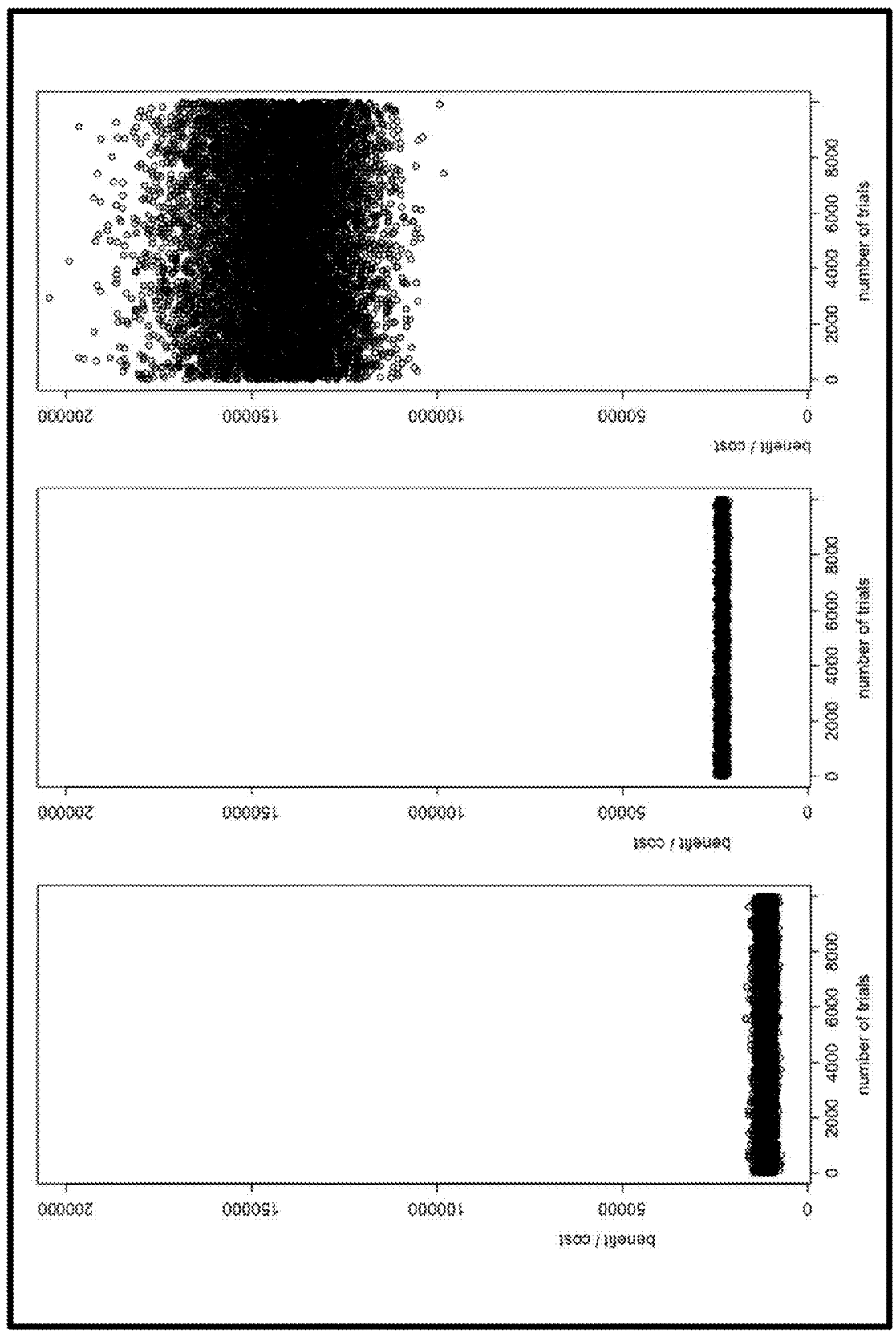
FIG. 7 shows an example of GC efficiency distribution.
Figure 8:
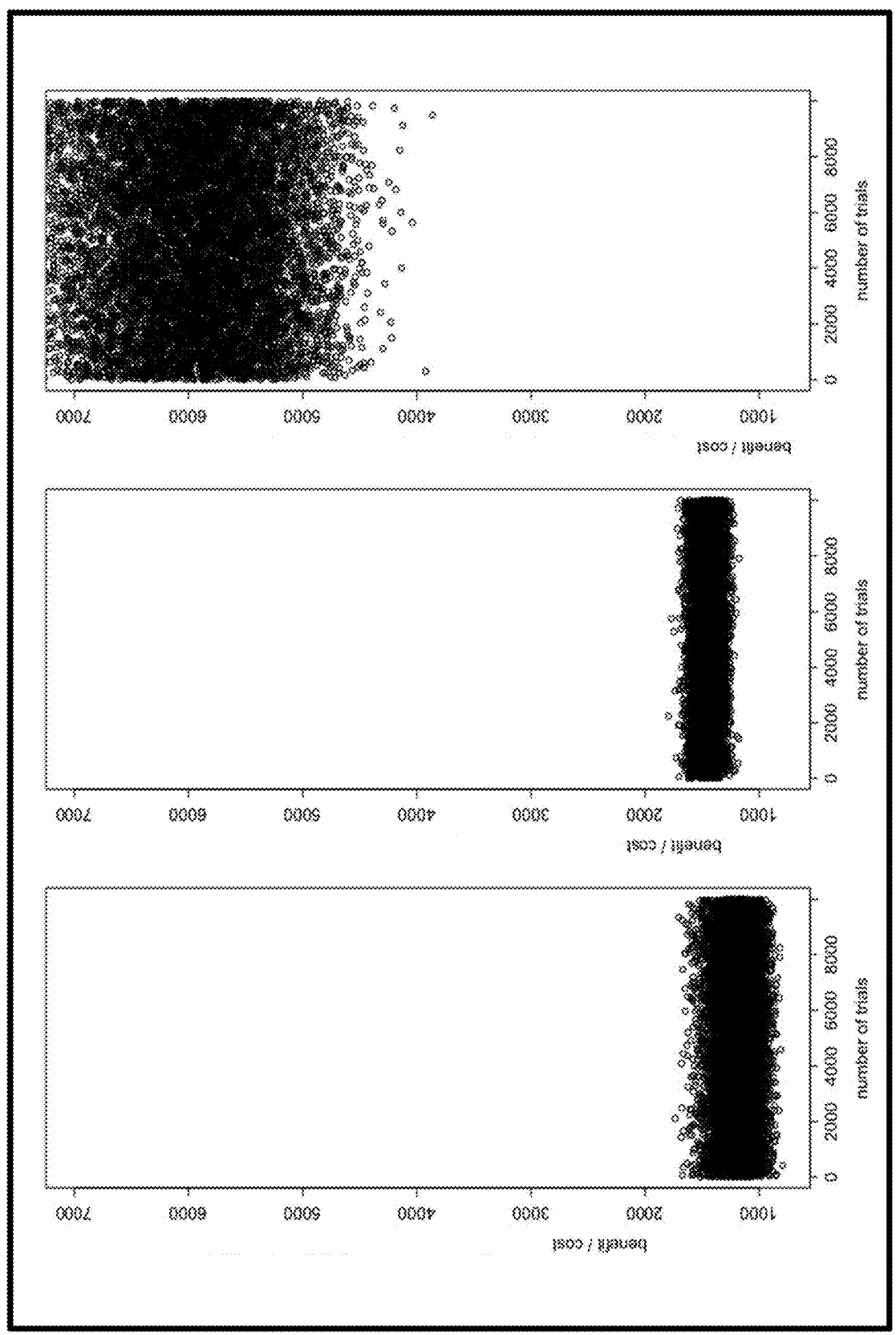
FIG. 8 shows another example of GC efficiency distribution.

FIGS. 7 and 8 show GC efficiency distributions with different conditions of the arrangement places of the logical-to-physical table T1 and the physical-to-logical table T2, the access frequency aging-reduction variation, and pages selected as GC targets. These pieces of data are results of creation of pages having random amounts of free areas based on actually measured values in the storage system 502, and GC efficiency simulation through the Monte Carlo method. Both of FIGS. 7 and 8 are as follows. That is, the left diagram shows the GC efficiency distribution in a case where the page is selected as copy sources (GC targets) in chronological order in view of time-series (in the order from the beginning of the physical addresses). The middle diagram shows the GC efficiency distribution in a case where the logical-to-physical table T1 and the physical-to-logical table T2 are in one or more drives 111, and the page having a high GC efficiency obtained by Expression 1 is selected as the copy source. The right diagram shows the GC efficiency distribution in a case where the logical-to-physical table T1 and the physical-to-logical table T2 are in the memory 103, and the page having a high benefit obtained by Expression 1 is selected as the copy source. With respect to the GC efficiency obtained by Expression 1, "segment" is replaced with "page". FIG. 7 shows the GC efficiency distributions in cases where the access frequency aging-reduction speed is low. FIG. 8 shows the GC efficiency distributions in cases where the access frequency aging-reduction speed is high. The GC efficiencies (benefit/cost) obtained as results of FIGS. 7 and 8 are obtained by Expression 1.

According to the results of FIGS. 7 and 8, when the logical-to-physical table T1 and the physical-to-logical table T2 are in the memory 503, the GC efficiency is high irrespective of access frequency aging-variation of data. On the other hand, when the access frequency aging-variation speed is high, there is not a large difference in GC efficiency between the case where the page is selected as the copy source simply from the front (in the order from the beginning of the physical address) and the case where the logical-to-physical table T1 and the physical-to-logical table T2 are not in the memory 503 and the page having a high GC efficiency is selected as the copy source.

Figure 6:
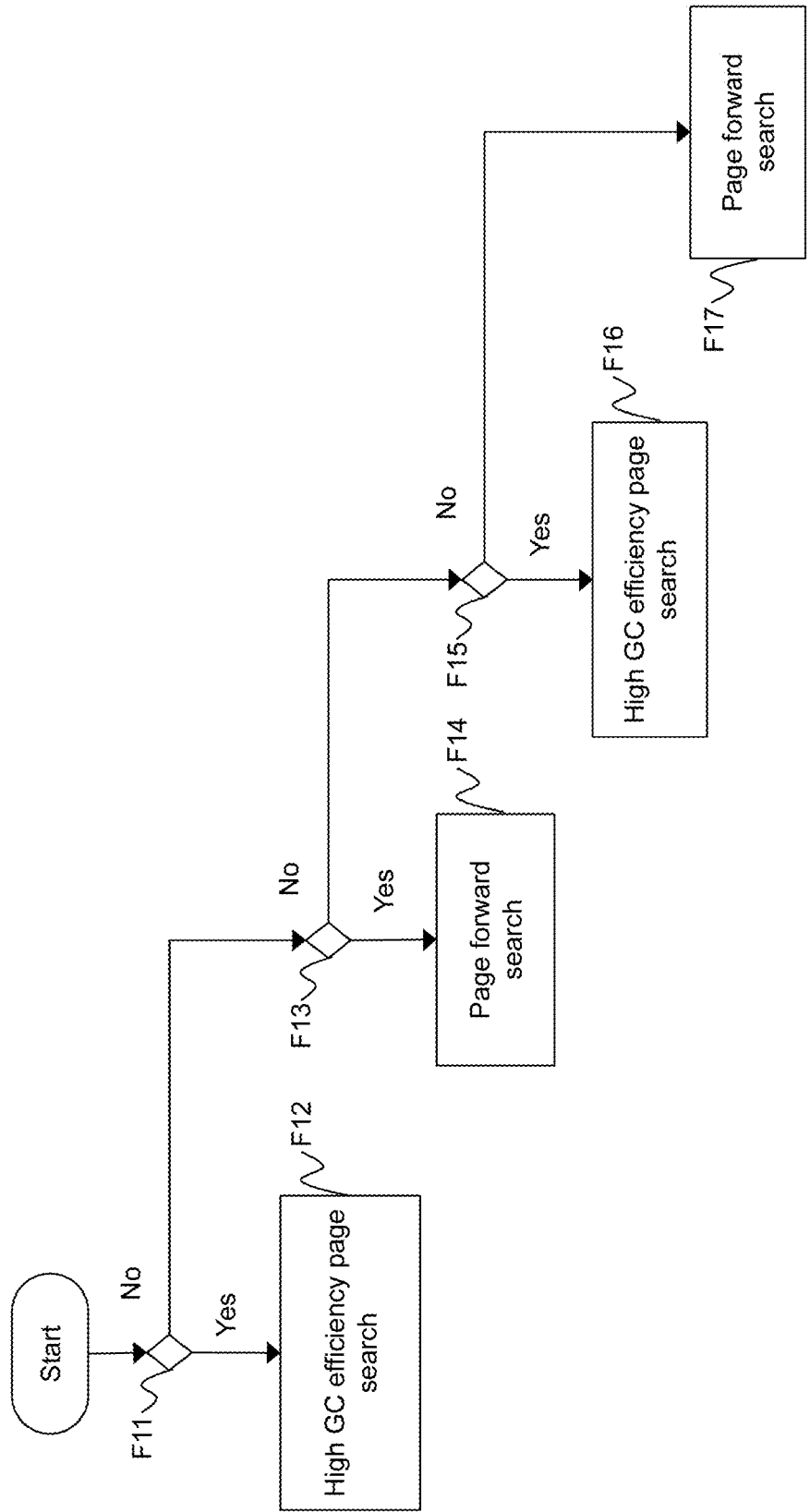
FIG. 6 shows an example of a processing flow of copy source selection.

The processing flow of selecting the copy-source page (GC target page) according to the above results is shown in FIG. 6. This processing flow is executed in the GC processing flow (e.g., executed between F1 and F2).

The GC 506 determines whether the logical-to-physical table T1 and the physical-to-logical table T2 are in the memory 503 (on-memory) or not (F11).

When the determination result of F11 is true, the GC 506 selects a "high GC efficiency page search" mode (F12). In this mode, the page having a relatively high GC efficiency obtained by Expression 1 on the basis of at least one of the logical-to-physical table T1 and the physical-to-logical table T2 in the memory 503 is selected as the copy source. More specifically, for example, the GC efficiency may be calculated for each GC target candidate page (a non-additionally recordable page containing a fragmented free area), and the page having a relatively high GC efficiency may be selected. The "page having a relatively high GC efficiency" may be a GC target candidate page having a GC efficiency equal to or higher than a predetermined threshold, or a page having a GC efficiency that satisfies X % (X>0) described above among multiple GC efficiencies corresponding to the respective GC target candidate pages.

When the determination result of F11 is false, the GC 506 determines whether the drive 111 (e.g., the drive 111 included in the RAID group corresponding to the physical address space) is an additionally recordable drive or not (F13).

When the determination result of F13 is true, the GC 506 selects a "page front search" mode (F14). In this mode, GC target candidate pages are searched for in chronological order in view of time-series (in the order of physical addresses) and the found pages are selected as the copy sources. The "additionally recordable drive" encompasses SSDs (Solid State Drives), such as a SMR (Singled Magnetic Recording) drive and NAND flash memory, and the like. Each block in the drives is a drive additional-write area (area in which data is to be written in the order of addresses). The "block" described here is an example of a unit area (e.g., in the case of NAND flash memory, the block also serves as a data erasing unit). The available free space cannot be reserved without freeing the entire block. Consequently, for the RAID group made up of multiple additionally recordable drives, the "high GC efficiency page search" mode for searching for a page that has a high GC efficiency and resides at a random position is unsuitable.

When the determination result of F13 is false, the GC 506 invokes the data age statistics 208, the access frequency aging-reduction variation speed is identified with respect to the physical address space, and it is determined whether the access frequency aging-reduction variation speed is low or not (e.g., whether the speed is less than a predetermined threshold or not) (F15). When the determination result of F15 is true, the GC 506 selects the "high GC efficiency page search" mode (F16). When the determination result of F15 is false, the GC 506 selects the "page front search" mode. Even in a case where the "high GC efficiency page search" and "page front search" have equivalent GC frequencies with a high access frequency aging-reduction speed, the "page front search" mode is selected. This is because a free area integrated in the physical address order is guaranteed to be secured, and the "page front search" mode has a smaller TAT of GC.

In Embodiment 2, the page suitable for the configuration and state of the storage system 502 is selected as the copy source. Consequently, further improvement in GC efficiency is expected.

The order of the determination is not necessarily in the order of F11, F13 and F15. Not all of the determinations of the F11, F13 and F15 are necessarily performed. For example, when the determination result of F11 is false, the page front search mode may be selected without F13 and F15. The determination of F13 may be performed without determination of F11; when the determination result of F13 is true, the page front search may be selected. When the determination result of F13 is false, the high GC efficiency page search mode may be selected without execution of any of the determination of F11 and the determination of F15.

In Embodiment 2 and also in Embodiment 1, the storage system may include at least the additionally recordable RAID group that is a RAID group made up of multiple additionally recordable drives, between this additionally recordable RAID group and the non-additionally recordable RAID group that is a RAID group made up of multiple non-additionally recordable drives (drives that are not additionally recordable drives).

Embodiment 3

Embodiment 3 is described. At this time, the difference from Embodiments 1 and 2 is mainly described. The points common to those of Embodiments 1 and 2 are omitted or simplified.

Typically, the GC type adopted in the storage system that performs GC is one. The storage system according to this Embodiment adopts both the threading GC and copying GC. One of the problems of threading GC is that at least one of the logical-to-physical table and the physical-to-logical table can have a large size incapable of being accommodated in the memory for the sake of free area management. In this Embodiment, the threading GC is performed with the same area unit as the area unit with which copying is performed in the copying GC.

Figure 9:
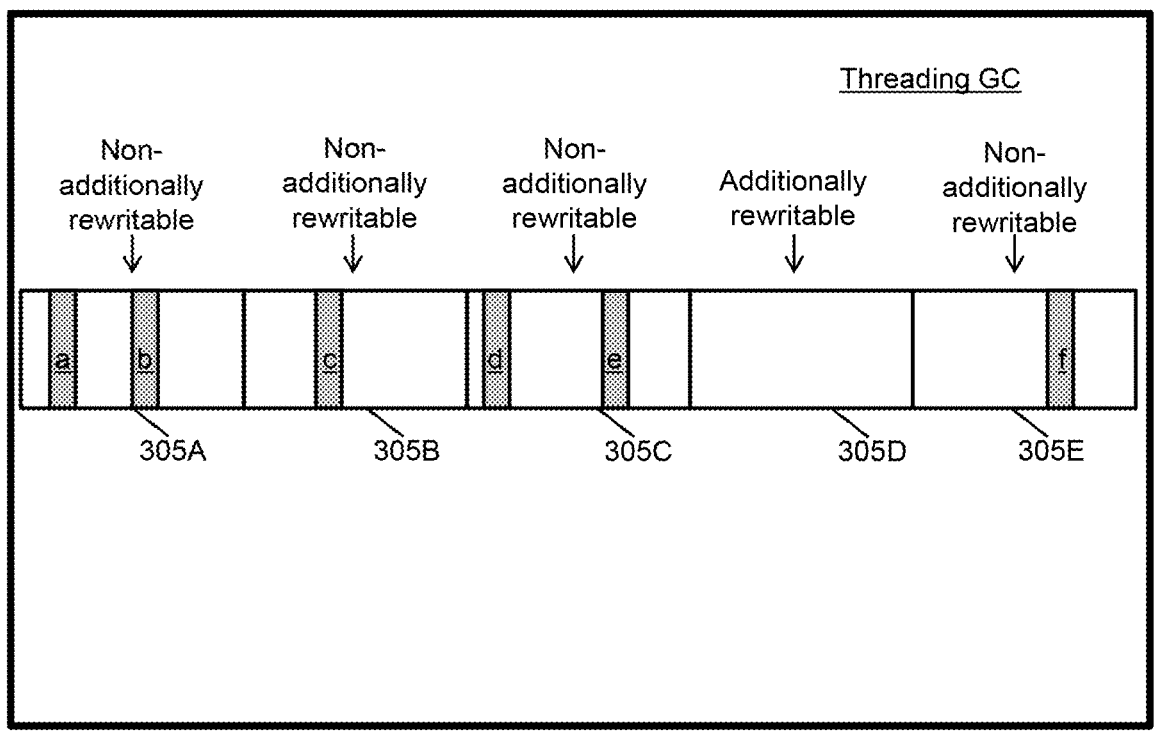
FIG. 9 is a diagram illustrating threading GC according to Embodiment 3.

That is, as shown in FIG. 9, the controller (including the processor and the memory) applies update, compression or de-duplication, as the threading GC, to existing data in the physical address space to thereby invalidate the existing data; when as a result of the process the page containing the area of the invalidated data becomes a free page (e.g., when a free page occurs before the current additionally writing-destination physical address (on the beginning side) in the physical address space), the physical address serving as the additional data writing destination is changed to the beginning of the free page newly occurring owing to invalidation of the existing data, even if the page indicated by the current additionally writing-destination physical address is an additionally recordable page (or becomes a non-additionally recordable page). Consequently, according to the next additional writing, the additionally writing target data is written from the beginning of the free page. In the example of FIG. 9, pages 305A, 305B, 305C and 305E are non-additionally recordable pages, and a page 305D is a free page (additionally recordable page) that occurs in the middle of the physical address space. In the example of FIG. 9, the controller does not select the beginning address of any of fragmented free areas on any of the non-additionally recordable pages 305A, 305B, 305C and 305E, as the additionally writing-destination physical address of the new additionally writing target data (e.g., updated data from the client 1, or compressed data generated by the post-process arithmetic compression). The controller selects the beginning address of the free area in the additionally recordable page 504D, as the additionally writing-destination physical address.

Figure 10:
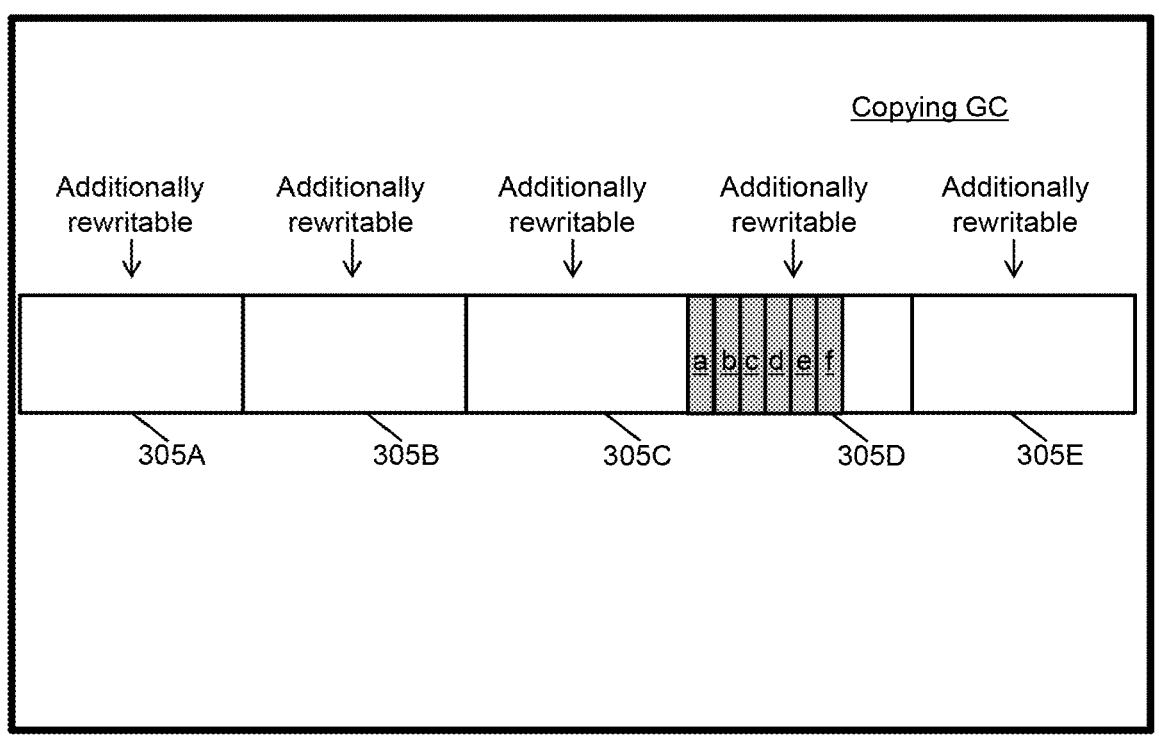
FIG. 10 is a diagram illustrating copying GC according to Embodiment 3.

On the other hand, in the copying GC (e.g., GC starting in a predetermined GC period), the controller copies the live data in the non-additionally recordable pages 305A, 305B, 305C and 305E to the additionally recordable page 305D, as shown in FIG. 10. Consequently, each of the pages 305A, 305B, 305C and 305E becomes an additionally recordable page.

In this Embodiment, in addition to the copying GC, the threading GC is performed, and the threading GC is performed in the same area unit as the area unit where copying is performed according to the copying GC. Consequently, in addition to the copying GC, the threading GC can be performed without increasing the size of at least one of the logical-to-physical table T1 and the physical-to-logical table T2.

Embodiment 4

Embodiment 4 is described. At this time, the difference from Embodiments 1 to 3 is mainly described. The points common to those of Embodiments 1 to 3 are omitted or simplified.

Figure 11:
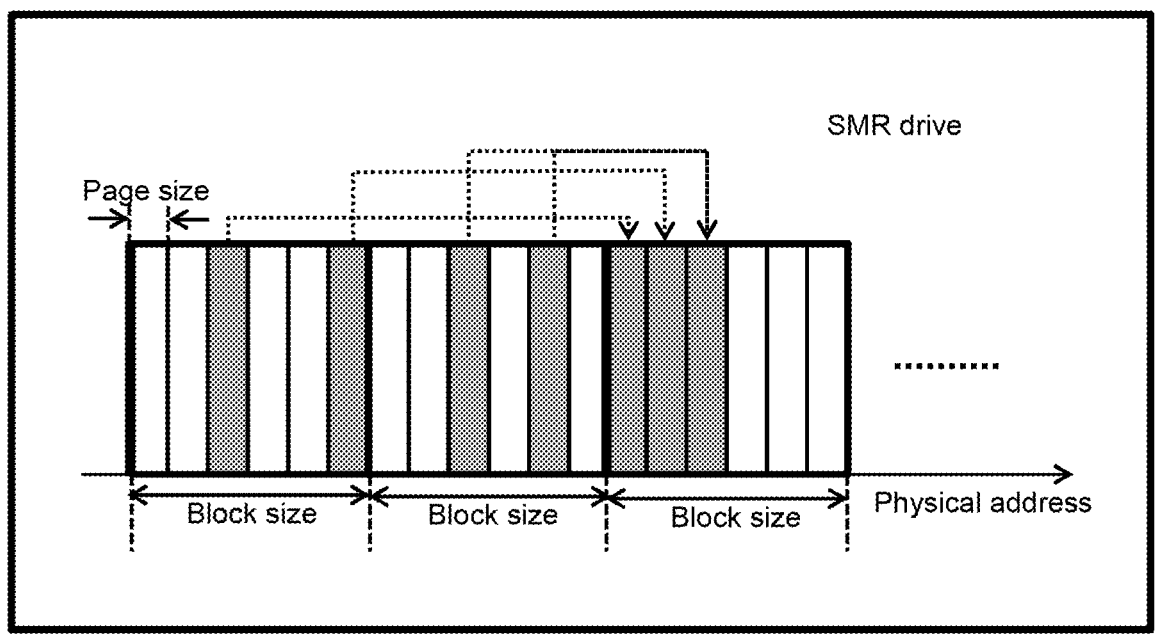
FIG. 11 shows an example of the relationship between the size of a page in a physical address space according to Embodiment 4 and the size of a block of an SMR drive according to Embodiment 4.

According to Embodiment 4, the size of the block of each additionally recordable drive in at least one additionally recordable RAID group is larger than the page size. For example, as exemplified in FIG. 11, it is assumed that the size of the block in the SMR drive is w times as large as the page size (w is an integer of two or more). One block includes multiple sub-blocks. One sub-block is an area corresponding to one page or a part of one page. In the latter case, for example, one page corresponds to multiple sub-blocks included in different SMR drives in the additionally recordable RAID group.

In such a case, if the transition order of the additionally writing-destination page is different from the address order of blocks, incapability of reading the live data from the block can occur in the copying GC or the threading GC.

Thus, according to this Embodiment, the controller determines the size of the unit area about the physical address space on the basis of the size of the block of the additionally recordable drive. Each unit area in the physical address space is, hereinafter, called "physical additional-writing area". Different block sets correspond to the respective physical additional-writing areas. Each block set includes multiple blocks included in different additionally recordable drives in the additionally recordable RAID group corresponding to the physical address space.

The controller manages whether the area is a non-additionally recordable area or an additionally recordable area, on a physical additional-writing area unit basis instead of or in addition to on a per-page basis. In the copying GC, the controller selects the copy destination of the live data on the physical additional-writing area basis instead of per-page basis. Thus, according to the copying GC, as exemplified in FIG. 11, in the additionally recordable drive (the SMR drive in FIG. 11), one or more pieces of live data are copied from one or more copy-source blocks to the copy-destination blocks. At this time, the one or more pieces of live data are sequentially written into the copy-destination block in the address order. The one or more copy-source blocks correspond to one or more copy-source physical additional-writing areas (non-additionally recordable area containing a fragmented free area). The copy-destination block corresponds to the copy-destination physical additional-writing area.

In Embodiment 4, the copying GC (and threading GC) can be executed without causing live data reading from the additionally recordable drive to be incapable.

Some Embodiments have thus been described above. These are exemplifications for illustrating the present invention. There is no intention to limit the scope of the present invention only to these Embodiments. The present invention can be executed in various other modes. For example, not both of the logical-to-physical table T1 and the physical-to-logical table T2 are necessarily provided. Only one of the logical-to-physical table T1 and the physical-to-logical table T2 is indispensable. That is, one or a combination of the logical-to-physical table T1 and the physical-to-logical table T2 may be an example of the address conversion information for address conversion between the logical address and the physical address.

REFERENCE SIGNS LIST

2, 502 Storage system

The invention claimed is:
1. A storage system, comprising:
a plurality of physical storage devices that include one or more RAID groups; and
a controller that is coupled to the plurality of physical storage devices, and includes a processor and a storage unit,
wherein an area of each of the one or more RAID groups is divided into a plurality of stripes, and each of the plurality of stripes includes a plurality of strips that are a plurality of areas corresponding to the respective physical storage devices,
a RAID configuration of each of the one or more RAID groups is a RAID configuration that requires a parity per stripe,
address conversion information that is information referred to by the controller for a sake of address conversion between a logical address in a logical address space and a physical address in a physical address space for the one or more RAID groups resides in at least one of the storage unit and the physical storage device,
data is configured to be additionally written into the physical address space by the controller,
in the physical address space, old data that is target data on any of update, compression, and de-duplication is invalidated by the controller to cause a fragmented free area,
the controller executes a copy GC (garbage collection) process using the address conversion information,
the copy GC process includes:
(A) from among a plurality of physical areas constituting the physical address space, selecting, as one or more copy source physical areas, one or more non-additionally recordable physical areas each including the fragmented free area;
(B) selecting an additionally recordable physical area as a copy destination physical area from among the physical areas; and
(C) writing one or more pieces of live data from the selected one or more copy source physical areas to a free area of the selected copy destination physical area on a per-strip or per-stripe basis, sequentially from a beginning of the free area, and in (C), if a size of write target data is less than a size required for writing on the per-strip or per-stripe basis, then the controller pads the write target data, and writes the padded write target data to the free area on the per-strip or per-stripe basis.

2. The storage system according to claim 1,
wherein, in (C),
the controller writes pieces of write target data other than a last piece of write target data among the one or more pieces of live data on the per-stripe basis without padding, and
only if the size of the last piece of write target data among the one or more pieces of live data is less than the size required for writing on the per-strip or per-stripe basis, then the controller performs padding for writing on the per-strip or per-stripe basis.

3. The storage system according to claim 2,
wherein data to be padded has a size less than a strip size.

4. The storage system according to claim 1,
wherein the controller selects any of a front search mode and a high GC efficiency page search mode, the front search mode being a mode that searches for the physical area containing the fragmented free area in a physical address order and selects a found physical area as the copy-source physical area, and the high GC efficiency page search mode being a mode that searches for a physical area having a relatively high GC efficiency calculated based on a benefit and cost of adoption as the copy-source physical area and selects a found physical area as the copy-source physical area, and
(A) is to select the copy-source physical area according to the selected mode.

5. The storage system according to claim 4,
wherein if the address conversion information is in the memory, the controller selects the high GC efficiency page search mode.

6. The storage system according to claim 5,
wherein even if the address conversion information is not in the memory, the controller selects the high GC efficiency page search mode in a case where the physical storage devices constituting the RAID group corresponding to the physical address space are not additionally recordable devices.

7. The storage system according to claim 6,
wherein even if the address conversion information is not in the memory, the controller selects the high GC efficiency page search mode in a case where the physical storage devices constituting the RAID group corresponding to the physical address space are not additionally recordable devices and where access frequency reduction variation speed with respect to data aging in relation to the physical address space is relatively low.

8. The storage system according to claim 4,
wherein if the address conversion information is not in the memory, the controller selects the area front search mode.

9. The storage system according to claim 8,
wherein even if the address conversion information is in the memory, the controller selects the area front search mode in a case where the physical storage devices constituting the RAID group corresponding to the physical address space are additionally recordable devices.

10. The storage system according to claim 9,
wherein even if the address conversion information is in the memory and the physical storage devices constituting the RAID group corresponding to the physical address space are not additionally recordable devices, the controller selects the area front search mode in a case where the access frequency reduction variation speed with respect to data aging in relation to the physical address space is relatively high.

11. The storage system according to claim 4,
wherein if the physical storage devices constituting the RAID group corresponding to the physical address space are not additionally recordable devices, the controller selects the high GC efficiency page search mode, and if the physical storage devices constituting the RAID group corresponding to the physical address space are the additionally recordable devices, the controller selects the area front search mode.

12. The storage system according to claim 4,
wherein if access frequency reduction variation speed with respect to data aging in relation to the physical address space is relatively low, the controller selects the high GC efficiency page search mode, and if the access frequency reduction variation speed with respect to data aging in relation to the physical address space is relatively high, the controller selects the area front search mode.

13. The storage system according to claim 1,
wherein if, as a result of invalidation of data existing in the physical address space due to update, compression or de-duplication of the existing data, a physical area containing an area of the invalidated data newly becomes a free physical area, the controller changes the additionally writing-destination physical address to be at a beginning of the new physical area.

14. The storage system according to claim 1,
wherein the physical address space corresponds to the RAID group including a plurality of additionally recordable devices,
each of the plurality of additionally recordable devices has a plurality of drive additional-write areas,
each of the plurality of drive additional-write areas is a storage area in which data is to be written in an address order,
the plurality of physical areas in the physical address space are associated with respective drive additional-space write area sets that are different from each other, and
each of the drive additional-write area sets is a plurality of drive additional-write areas included in each of the additionally recordable devices.

15. A storage control method for a storage system,
wherein the storage system comprises:
a plurality of physical storage devices that include one or more RAID groups; and
a controller that is coupled to the plurality of physical storage devices, and includes a processor and a storage unit,
wherein an area of each of the one or more RAID groups is divided into a plurality of stripes, and each of the plurality of stripes includes a plurality of strips that are a plurality of areas corresponding to the respective physical storage devices,
a RAID configuration of each of the one or more RAID groups is a RAID configuration that requires a parity per stripe,
address conversion information that is information referred to by the controller for a sake of address conversion between a logical address in a logical address space and a physical address in a physical address space for the one or more RAID groups resides in at least one of the storage unit and the physical storage device, data is to be additionally written into the physical address space by the controller, and in the physical address space, old data that is target data on any of update, compression, and de-duplication is invalidated by the controller to cause a fragmented free area, the storage control method:

(A) refers to the address conversion information, and, from among a plurality of physical areas constituting the physical address space, selects, as one or more copy source physical areas, one or more non-additionally recordable physical areas each including the fragmented free area;

(B) refers to the address conversion information, and selects an additionally recordable physical area as a copy destination physical area from among the physical areas; and (C) writes one or more pieces of live data from the selected one or more copy source physical areas to a free area of the selected copy destination physical area on a per-strip or per-stripe basis, sequentially from a beginning of the free area, and, if the size of the write target data is less than a size required for writing on a per-strip or per-stripe basis, then the method pads the write target data, and writes the padded write target data to the free area on the per-strip or per-stripe basis.

* * * * *